United States Patent
Col et al.

(10) Patent No.: US 9,501,286 B2
(45) Date of Patent: Nov. 22, 2016

(54) MICROPROCESSOR WITH ALU INTEGRATED INTO LOAD UNIT

(75) Inventors: Gerard M. Col, Austin, TX (US);
Colin Eddy, Austin, TX (US); Rodney E. Hooker, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 1713 days.

(21) Appl. No.: 12/609,169

(22) Filed: Oct. 30, 2009

(65) Prior Publication Data

US 2011/0035569 A1 Feb. 10, 2011

Related U.S. Application Data

(60) Provisional application No. 61/232,254, filed on Aug. 7, 2009.

(51) Int. Cl.
*G06F 9/38* (2006.01)
*G06F 9/30* (2006.01)
*G06F 12/08* (2016.01)

(52) U.S. Cl.
CPC ........... *G06F 9/3875* (2013.01); *G06F 9/3001* (2013.01); *G06F 9/3004* (2013.01); *G06F 9/3017* (2013.01); *G06F 9/30043* (2013.01); *G06F 9/30145* (2013.01); *G06F 9/3893* (2013.01); *G06F 12/0875* (2013.01)

(58) Field of Classification Search
CPC .............................. G06F 9/3004; G06F 9/3893
See application file for complete search history.

(56) References Cited

U.S. PATENT DOCUMENTS

| | | | | |
|---|---|---|---|---|
| 5,751,984 A * | 5/1998 | Chang et al. | ............ | 712/216 |
| 5,983,344 A * | 11/1999 | Henry et al. | ............ | 712/245 |
| 6,330,657 B1 * | 12/2001 | Col et al. | ............ | 712/23 |
| 6,338,136 B1 * | 1/2002 | Col et al. | ............ | 712/221 |
| 7,055,022 B1 * | 5/2006 | Col et al. | ............ | 712/233 |
| 7,096,345 B1 * | 8/2006 | Chen et al. | ............ | 712/218 |
| 7,139,899 B2 * | 11/2006 | Kerr et al. | ............ | 712/218 |
| 7,280,112 B1 | 10/2007 | Hutchins | | |
| 2008/0046683 A1 * | 2/2008 | Codrescu et al. | ............ | 712/7 |
| 2008/0320286 A1 | 12/2008 | Campbell et al. | | |
| 2009/0172349 A1 * | 7/2009 | Sprangle et al. | ............ | 712/4 |

* cited by examiner

*Primary Examiner* — Jacob A Petranek
(74) *Attorney, Agent, or Firm* — Gary Stanford; James W. Huffman

(57) ABSTRACT

A superscalar pipelined microprocessor includes a register set defined by its instruction set architecture, a cache memory, execution units, and a load unit, coupled to the cache memory and distinct from the other execution units. The load unit comprises an ALU. The load unit receives an instruction that specifies a memory address of a source operand, an operation to be performed on the source operand to generate a result, and a destination register of the register set to which the result is to be stored. The load unit reads the source operand from the cache memory. The ALU performs the operation on the source operand to generate the result, rather than forwarding the source operand to any of the other execution units of the microprocessor to perform the operation on the source operand to generate the result. The load unit outputs the result for subsequent retirement to the destination register.

38 Claims, 12 Drawing Sheets

MICROPROCESSOR WITH ALU INTEGRATED INTO LOAD UNIT

CROSS REFERENCE TO RELATED APPLICATION(S)

This application claims priority based on U.S. Provisional Application Ser. No. 61/232,254, filed Aug. 7, 2009, entitled ALU FUNCTION INTEGRATED INTO LOADS, which is hereby incorporated by reference in its entirety.

This application is related to U.S. Non-Provisional Application TBD, entitled MICROPROCESSOR WITH ALU INTEGRATED INTO STORE UNIT, which is concurrently filed herewith and which was owned or subject to an obligation of assignment to VIA Technologies, Inc. or one of its wholly-owned subsidiaries at the time the invention claimed herein was made.

FIELD OF THE INVENTION

The present invention relates in general to the field of microprocessors, and particularly to the microarchitecture of a microprocessor.

BACKGROUND OF THE INVENTION

A paradigm of reduced instruction set computer (RISC) architecture processors is that they employ a load/store architecture. That is, they include a load instruction that loads an operand from memory into a register of the processor and a store instruction that stores an operand from a register of the processor into memory. Paradigmatically, these are the only instructions that access memory. The other instructions that perform arithmetic/logical operations receive their operands from the registers and write their results to the registers. That is, the non-load/store instructions are not allowed to specify an operand in memory, which enables most of them to be executed in a single clock cycle, in contrast to a load instruction which takes multiple clock cycles to access memory (i.e., cache or system memory). Thus, a common sequence of instructions might include a load instruction that fetches an operand from memory into a first register, followed by an arithmetic/logical instruction that performs an arithmetic/logical operation (e.g., add, subtract, increment, multiply, shift/rotate, Boolean AND, OR, NOT, etc.) on the operand in the first register and writes the result to a second register, followed by a store instruction that writes the result in the second register to memory. The advantages of the load/store architecture paradigm are well known.

A natural outgrowth of the load/store architecture is that many processors include distinct load/store units that are separate from execution units that perform the arithmetic/logical operations. That is, a load unit performs only loads of data from memory into a register; a store unit performs only stores of data from a register to memory; and the arithmetic/logical execution units perform arithmetic/logical operations on operands from source registers and write the results to a destination register. Thus, using the example instruction sequence above, the load unit executes the load instruction to fetch the operand from memory into the first register, an arithmetic/logical unit executes the arithmetic/logical instruction to perform the arithmetic/logical operation on the operand in the first register (perhaps using a second operand in another register) and writes the result to the second register, and the store unit executes the store instruction that writes the result in the second register to memory.

An advantage of having the distinct load/store units and arithmetic/logical units is that they may be simpler and faster. However, a disadvantage is that valuable time is consumed in the transfer of the results between the various units through the registers. This is partly solved by forwarding buses that forward a result from an execution unit directly to another execution unit without going through the registers. However, there is still time consumed, i.e., delay, in the forwarding. The amount of time consumed is predominantly a function of the distance the signals must travel on the forwarding buses between the different execution units and RC time constants associated with the signal traces. The time delay associated with result forwarding may amount to one or more clock cycles, depending upon the layout of the execution units and the process technology of a given design.

BRIEF SUMMARY OF INVENTION

In one aspect the present invention provides a superscalar pipelined microprocessor. The microprocessor includes a register set defined by an instruction set architecture of the microprocessor, a cache memory, execution units, and a load unit, coupled to the cache memory. The load unit is distinct from the other execution units of the microprocessor. The load unit comprises an arithmetic/logic unit (ALU). The load unit is configured to receive an instruction that specifies a memory address of a source operand, an operation to be performed on the source operand to generate a result, and a destination register of the register set to which the result is to be stored. The load unit is also configured to read the source operand from the cache memory. The ALU is configured to perform the operation on the source operand to generate the result, rather than forwarding the source operand to any of the other execution units of the microprocessor to perform the operation on the source operand to generate the result. The load unit is also configured to output the result for subsequent retirement to the destination register.

In another aspect, the present invention provides a method for a superscalar pipelined microprocessor to process an instruction, the microprocessor having a register set defined by an instruction set architecture of the microprocessor, a cache memory, execution units, and a load unit distinct from the other execution units of the microprocessor. The method includes the load unit receiving an instruction that specifies a memory address of a source operand, an operation to be performed on the source operand to generate a result, and a destination register of the register set to which the result is to be stored. The method also includes the load unit reading the source operand from the cache memory. The method also includes the load unit performing the operation on the source operand to generate the result, wherein the performing the operation is performed by an arithmetic/logic unit (ALU) of the load unit rather than forwarding the source operand to any of the other execution units of the microprocessor to perform the operation on the source operand to generate the result. The method also includes the load unit outputting the result for subsequent retirement to the destination register.

In yet another aspect, the present invention provides a computer program product for use with a computing device, the computer program product comprising a computer usable storage medium having computer readable program code embodied in the medium for specifying a superscalar pipelined microprocessor. The computer readable program code includes first program code for specifying a register set defined by an instruction set architecture of the microprocessor. The computer readable program code also includes second program code for specifying a cache memory. The computer readable program code also includes third program code for specifying execution units. The computer readable program code also includes fourth program code for specifying a load unit, coupled to the cache memory, wherein the load unit is distinct from the other execution units of the microprocessor. The load unit comprises an arithmetic/logic unit (ALU). The load unit is configured to receive an instruction that specifies a memory address of a source operand, an operation to be performed on the source operand to generate a result, and a destination register of the register set to which the result is to be stored. The load unit is configured to read the source operand from the cache memory. The ALU is configured to perform the operation on the source operand to generate the result, rather than forwarding the source operand to any of the other execution units of the microprocessor to perform the operation on the source operand to generate the result. The load unit is further configured to output the result for subsequent retirement to the destination register.

DETAILED DESCRIPTION OF THE INVENTION

The present inventors have recognized that in a pipelined load unit design, there may be a portion of the clock cycle within the last stage that is partly unused. That is, the delay time through the circuitry of the last stage of the load unit is only a fraction of the clock cycle time. Advantageously, embodiments are described herein that integrate an arithmetic/logical unit (ALU) into the last stage of the load unit that enables the load unit to perform arithmetic/logical operations on the load data fetched from memory before loading it into the destination register. Advantageously, this allows saving the time that would otherwise be consumed by forwarding the load data to a separate arithmetic/logical execution unit to perform the arithmetic/logical operation. The microprocessor employs a load/store microarchitecture that implements the non-load/store x86 architecture (or macroarchitecture) of the processor. The instruction translator generates special forms of the load microinstruction (referred to herein as ldalu microinstructions) that instruct the load unit to perform both the load from memory and the appropriate ALU operation on the load data. This enables the microprocessor to implement complex macroinstructions that require both a read from memory and an ALU operation completely within the load unit without having to involve another execution unit to perform the ALU operation, thereby avoiding the result forwarding delay.

Figure 1:
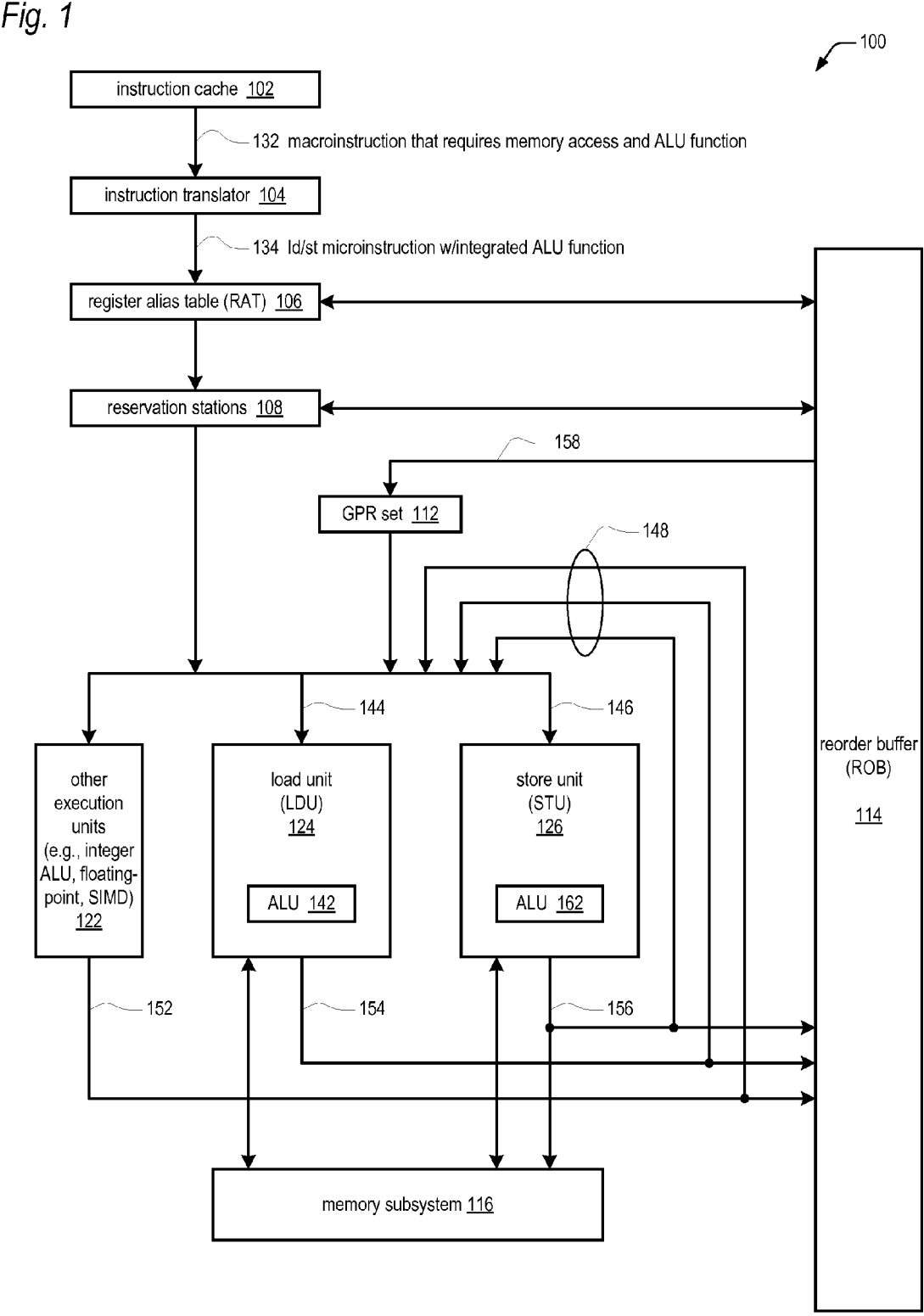
FIG. 1 is a block diagram illustrating a superscalar, pipelined microprocessor according to the present invention.

Referring now to FIG. 1, a block diagram illustrating a superscalar, pipelined microprocessor 100 according to the present invention is shown. The microprocessor 100 includes an instruction cache 102 that caches macroinstructions of an instruction set architecture, such as the x86 instruction set architecture. The macroinstructions 132 include instructions that require a memory access and an ALU function. For example, an x86 MOVZX reg, mem (Move with Zero-Extend) instruction instructs the microprocessor 100 to copy the contents of the source operand in memory to the destination register and to zero-extend the value. The zero-extension is relevant in cases where the size of the destination register is larger than the effective size of the memory operand. Other examples include x86 instructions that involve a memory operand and an ALU function, such as ADD, SUB, INC, DEC, MUL, SAL/SAR/SHL/SHR, RCL/RCR/ROL/ROR, AND, OR, NOT, XOR, and so forth.

The microprocessor 100 includes an instruction translator 104 coupled to the instruction cache 102 that translates the macroinstructions 132 into microinstructions 134, such as the special ldalu microinstructions that instruct the load unit 124 (discussed in more detail below) to both load data from memory and perform an ALU operation on the load data. Additionally, in another embodiment described below, the instruction translator 104 translates macroinstructions 132 into microinstructions 134, such as special stalu microinstructions that instruct the store unit 126 (discussed in more detail below) to both perform an ALU operation on store data and to store the data to memory.

The microprocessor 100 includes a register alias table (RAT) 106 that generates microinstruction dependencies and dispatches the microinstructions 134 in program order to reservation stations 108. The reservation stations 108 issue the microinstructions 134 to the execution units, i.e., the load unit 124, store unit 126, and other execution units 122 for execution. In one embodiment, the reservation stations 108 issue the microcode instructions 134 out of program order. The other execution units 122 may include, for example, integer ALU units, floating point units, and single-instruction-multiple-data (SIMD) execution units, such as MMX and SSE units. The execution units 122/142/162 provide their results 152/154/156, respectively, to a reorder buffer (ROB) 114 that ensures in-order retirement of instructions to architectural state. The microprocessor 100 also includes a memory subsystem 116 coupled to the load unit 124 and store unit 126. The memory subsystem 116 includes cache memories, load buffers, store buffers, and a bus interface unit.

The execution units 122/142/162 receive operands from a general purpose register set 112. The execution units 122/142/162 also receive results 152/154/156 from each other as operands on result forwarding busses 148. In particular, the load unit 124 receives operands on a bus 144 and the store unit 126 receives operands on a bus 146. The load unit 124 includes an ALU 142, and the store unit 126 includes an ALU 162, whose operation are discussed in more detail below.

ALU Function Integrated into Loads

Figure 2:
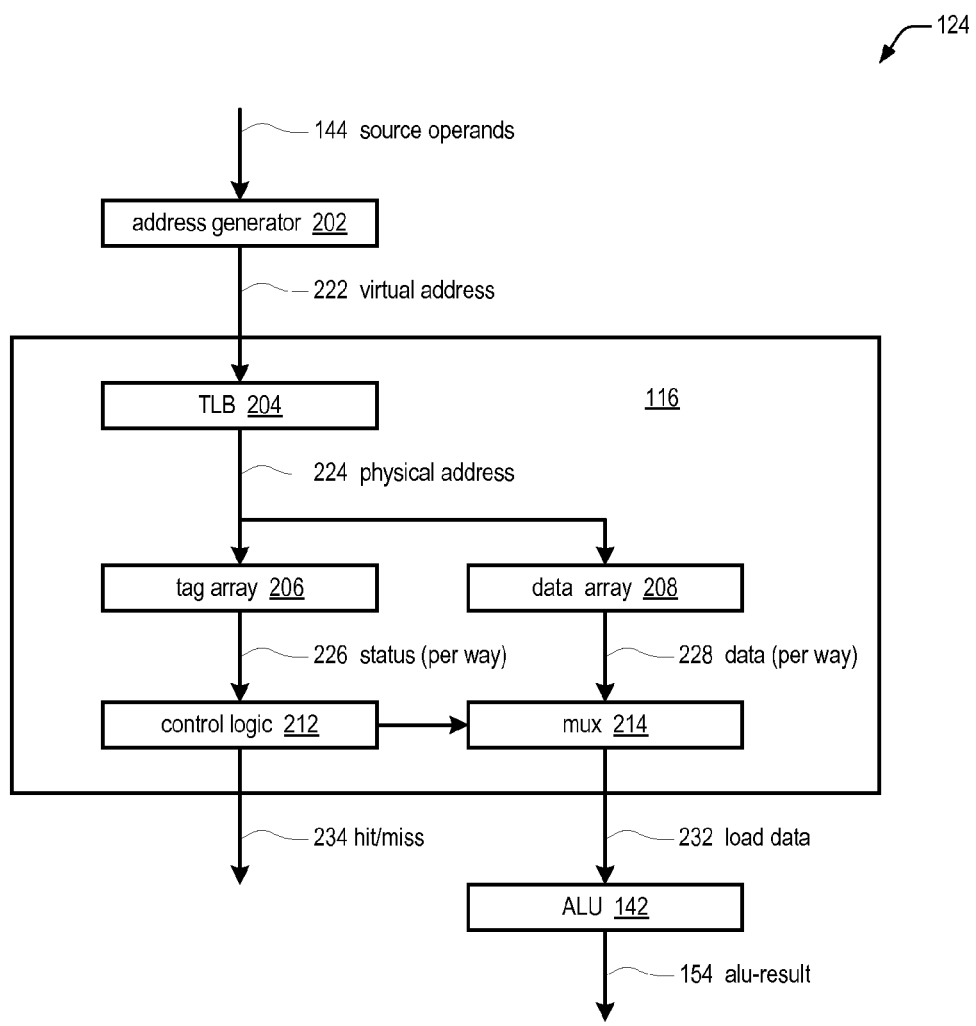
FIG. 2 is a block diagram of the load unit of FIG. 1 according to the present invention.

Referring now to FIG. 2, a block diagram of the load unit 124 of FIG. 1 according to the present invention is shown. The load unit 124 includes an address generator 202 that generates the virtual load address 222 (i.e., the memory address from which the data will be loaded) using the source operands 144 of FIG. 1. The load unit 124 accesses a translation lookaside buffer (TLB) 204 of the memory subsystem 116, which looks up the virtual address 222 to provide the translated physical address 224. A cache tag array 206 looks up a tag portion of the physical address 224 and provides status 226 for each way of the cache. The index portion of the physical address 224 indexes a cache data array 208, which outputs a cache line 228 for each way of the cache. Control logic 212 examines the status 226 to determine whether the physical address 224 is a hit/miss 234 in the cache. Additionally, the control logic 212 controls a mux 214 that selects the appropriate cache line 228 output by the data array 208 and the data (which may be 1, 2, 4, 8, 16, 32, or 64 bytes according to one embodiment) within the cache line specified by the load instruction or ldalu instruction, which is provided as load data 232.

In a conventional load unit 124, the load data 232 would be provided as the result of a conventional load instruction. However, advantageously, the load unit 124 of the present invention also includes the ALU 142 of FIG. 1 that receives the load data 232 and selectively performs an ALU operation on the load data 232 to generate an alu-result 154. (If the instruction is a normal load instruction, then the ALU 142 simply passes the load data 232 through as the result 154.) The ALU 142 is configured to perform various operations according to various embodiments.

In one embodiment, the ALU 142 performs a zero-extend operation, and includes a plurality of AND gates to mask off (i.e., zero-extend) upper bits of the load data 232 not included in the memory operand size specified by the ldalu instruction.

In other embodiments, the ALU 142 is configured to additionally perform one or more single operand operations including, but not limited to, the following:
 1. Boolean NOT operation: the alu-result 154 has each bit of the load data 232 inverted
 2. NEGATE operation: the alu-result 154 is the two's complement negation of the load data 232
 3. increment operation: the alu-result 154 is the load data 232 incremented by 1
 4. decrement operation: the alu-result 154 is the load data 232 decremented by 1
 5. a sign-extend operation: the alu-result 154 is a sign-extended version of the load data 232
 6. a zero detect operation: the alu-result 154 is a true of the load data 232 is zero and false if the load data 232 is non-zero
 7. ones detect operation: the alu-result 154 is a true of the load data 232 is all binary '1' and false if the load data 232 is not all binary '1'
 8. data format conversion operation: the alu-result 154 is the load data 232 formatted to a specified data format, e.g., to a floating point format or SIMD format In the alternate embodiment of FIG. 6, the ALU 142 is configured to receive a second operand 652 and to perform a double operand ALU function on the second operand 652 and the load data 232. The ALU 142 may be configured to additionally perform one or more double operand operations including, but not limited to, the following:
 9. Boolean Logical (AND, OR, XOR, NOR) operation: the ALU 142 performs the specified Boolean Logical operation on the second operand 652 and load data 232 to produce the alu-result 154
 10. Arithmetic (ADD, SUB, MUL) operation: the ALU 142 performs the specified Arithmetic operation on the second operand 652 and load data 232 to produce the alu-result 154

Figure 6:
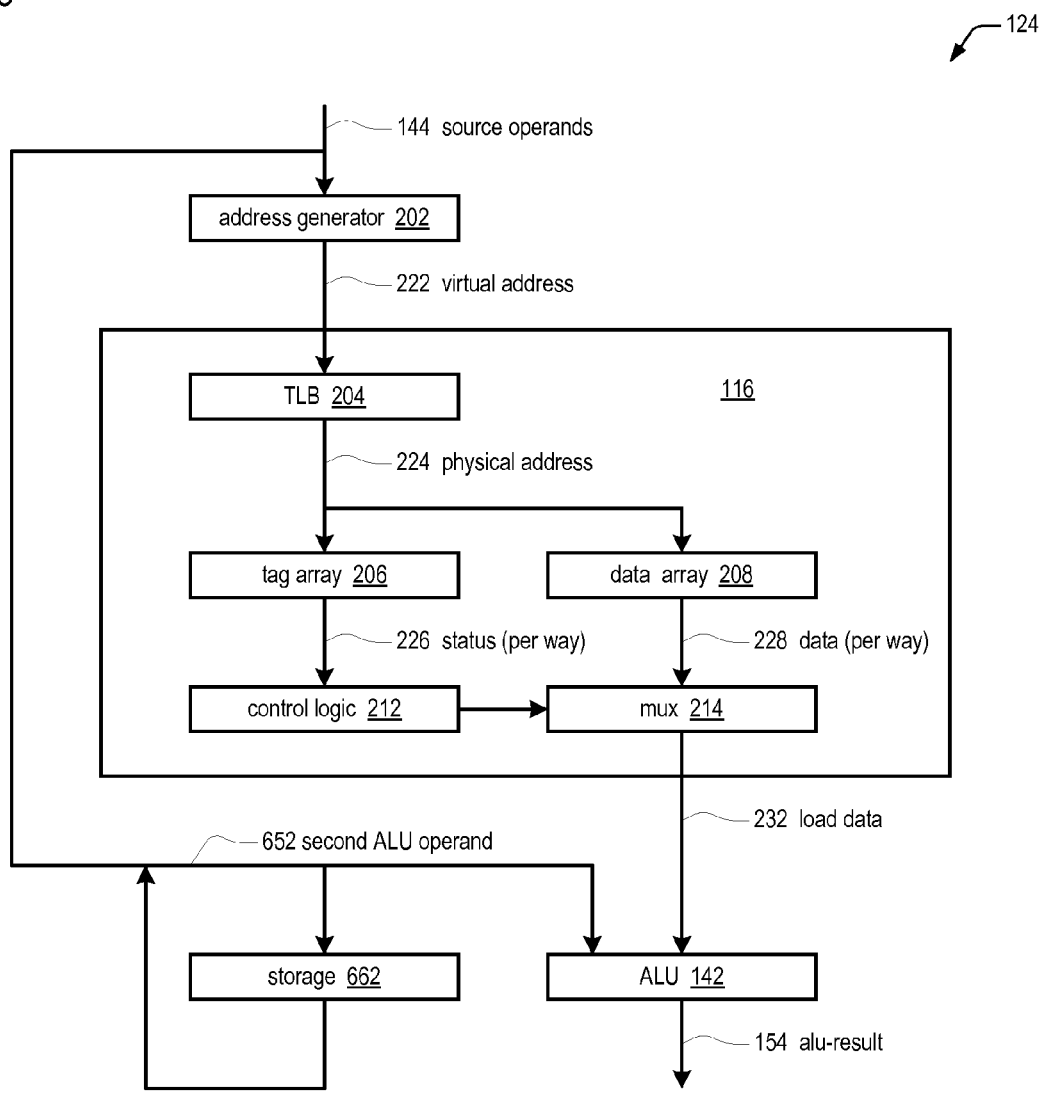
FIG. 6 is a block diagram of the load unit of FIG. 1 according to an alternate embodiment of the present invention.

In the alternate embodiment of FIG. 6, the load unit 124 includes storage 662 for storing the second operand 652 in the event that the load address misses in the data cache such that the load data must be fetched from system memory and the ldalu instruction must be replayed within the load unit 124.

Figure 3:
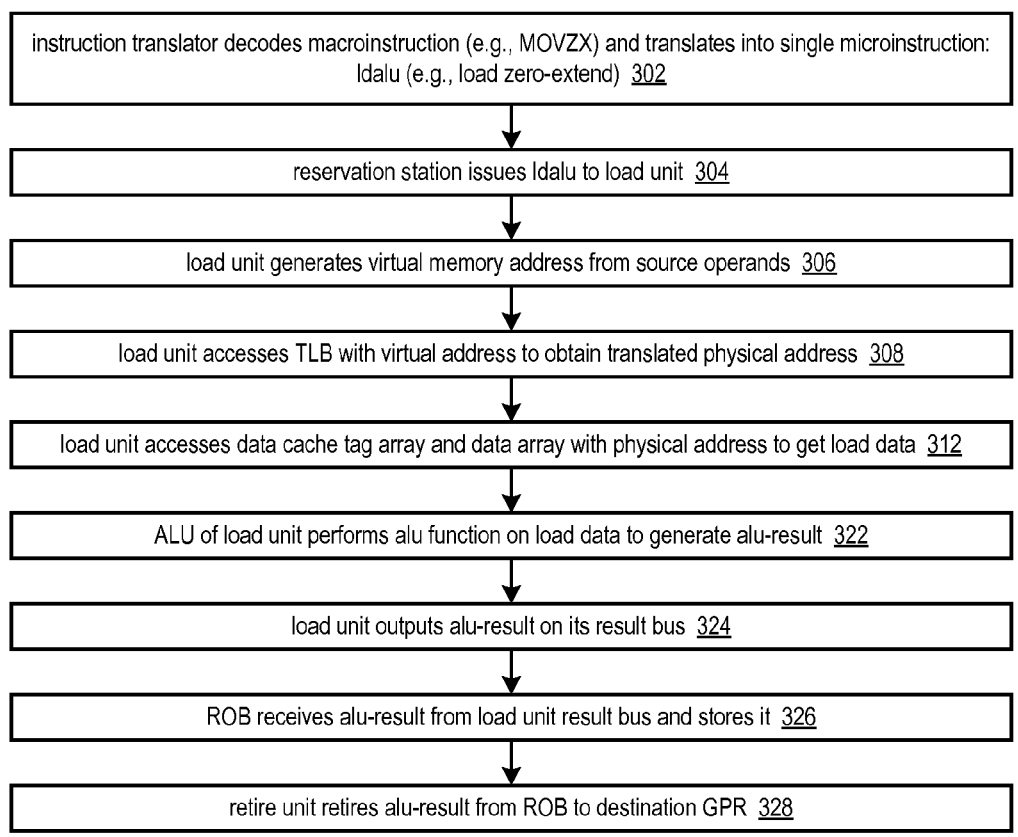
FIG. 3 is a flowchart illustrating operation of the microprocessor of FIG. 1 according to the present invention.

Referring now to FIG. 3, a flowchart illustrating operation of the microprocessor 100 of FIG. 1 according to the present invention is shown. Flow begins at block 302.

At block 302, the instruction translator 104 decodes a macroinstruction 132 and translates it into a single ldalu microinstruction 134. The macroinstruction 132 specifies operands for generating a memory address from which data is to be fetched. The macroinstruction 132 also specifies an ALU operation to be performed on the data fetched from memory to generate a result. The macroinstruction 132 also specifies a GPR 112 that is to be the destination register of the result. The ldalu instruction specifies the same address operands as the macroinstruction 132. Furthermore, the ldalu instruction specifies the same ALU operation specified by the macroinstruction 132. Finally, the ldalu instruction specifies the same GPR 112 for its destination operand as the macroinstruction 132. For example, the macroinstruction 132 may be an x86 MOVZX reg, mem instruction or a PMOVZX reg, mem instruction, in which case the instruction translator 104 translates it into a single ldalu microinstruction that specifies zero-extend as the ALU function. Flow proceeds to block 304.

At block 304, the reservation station 112 issues the ldalu instruction to the load unit 124. Flow proceeds to block 306.

At block 306, the load unit 124 generates the virtual address 222 based on the source operands 144 specified by the ldalu instruction. Flow proceeds to block 308.

At block 308, the load unit 124 looks up the load virtual address 222 in the TLB 204 to obtain the load physical address 224. Flow proceeds to block 312.

At block 312, the load unit 124 accesses the data cache tag array 206 and the data cache data array 208 with the physical address 224 in order to get the status 226 and cache line data 228, and the mux 214 selects the load data 232 specified by the ldalu instruction. Flow proceeds to block 322.

At block 322, the load unit 124 ALU 142 performs the ALU function specified by the ldalu instruction on the load data 232 to generate the alu-result 154. Flow proceeds to block 324.

At block 324, the load unit 124 outputs the alu-result 154 on its result bus. Advantageously, the fact that the ALU 142 performed the needed ALU operation to generate the alu-result 154 alleviates the need for the load data 232 to be forwarded to another execution unit 122 to perform the ALU operation and the concomitant delay associated with the forwarding operation. Flow proceeds to block 326.

At block 326, the ROB 114 receives the alu-result 154 from the load unit 124 result bus and stores it. Flow proceeds to block 328.

At block 328, the ROB 114 retires the alu-result 154 stored therein to the destination GPR 112. Flow ends at block 328.

Figure 4:
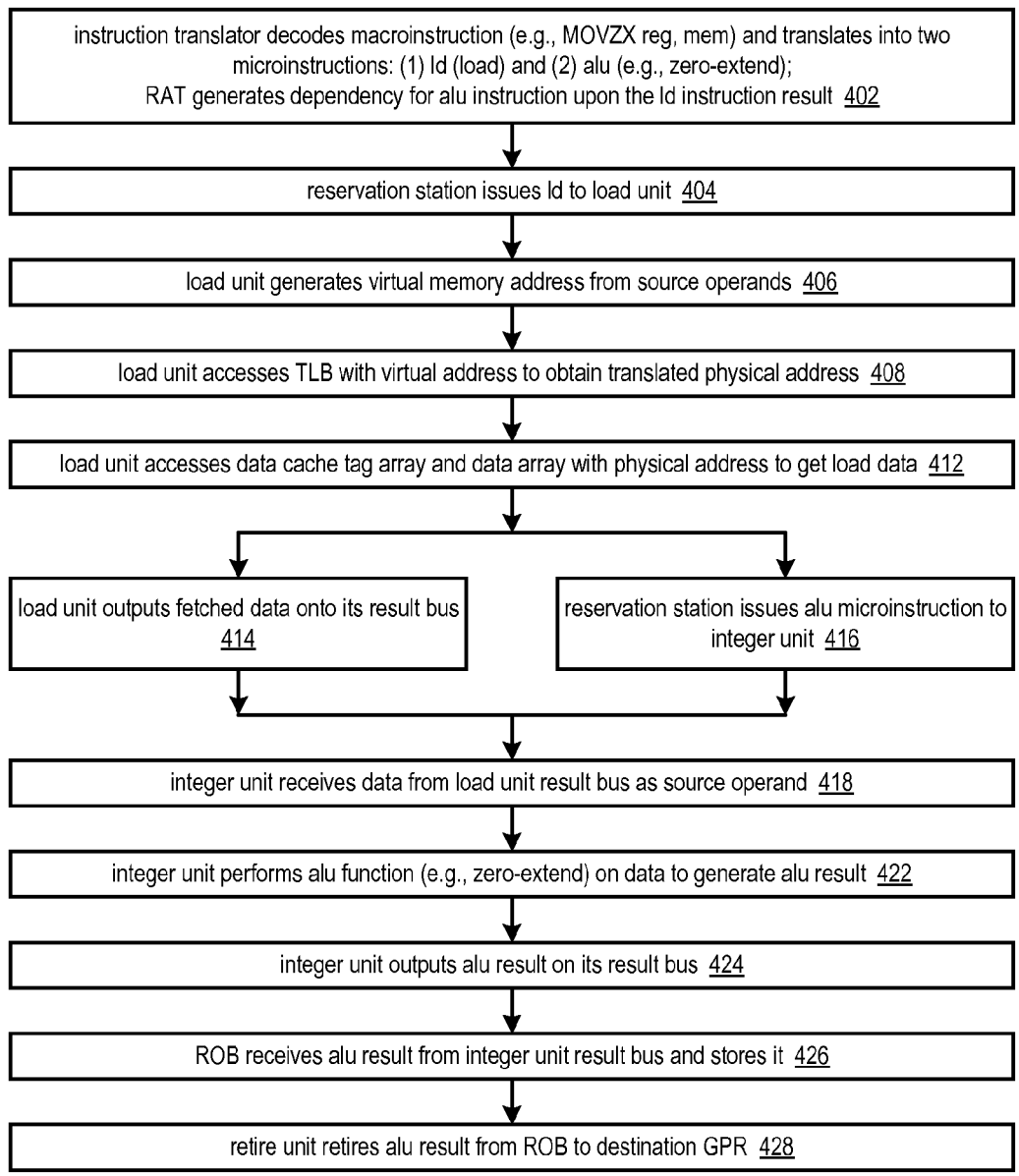
FIG. 4 is a flowchart illustrating operation of a conventional microprocessor.

Referring now to FIG. 4, a flowchart illustrating operation of a conventional microprocessor is shown in order to contrast the operation of the microprocessor 100 of the present invention. Although the elements of the microprocessor 100 of FIG. 1 are used in the description of FIG. 4, it should be understood that in the conventional microprocessor the load unit does not include an ALU for performing ALU operations on the load data and the instruction translator does not generate special ldalu instructions for the load unit. Flow begins at block 402.

At block 402, the instruction translator 104 decodes a macroinstruction 132 and translates it into two microinstruction 134, namely a load instruction and an alu instruction. For example, the macroinstruction 132 may be an x86 MOVZX reg, mem instruction or a PMOVZX reg, mem instruction, in which case the instruction translator 104 translates it into a load microinstruction and an alu microinstruction that specifies zero-extend as the ALU function. Subsequently, the RAT 116 generates a dependency for the alu microinstruction upon the load microinstruction. Flow proceeds to block 404.

At block 404, the reservation station 112 issues the load instruction to the load unit 124. Flow proceeds to block 406.

At block 406, the load unit 124 generates the virtual address 222 based on the source operands 144 specified by the load instruction. Flow proceeds to block 408.

At block 408, the load unit 124 looks up the load virtual address 222 in the TLB 204 to obtain the load physical address 224. Flow proceeds to block 412.

At block 412, the load unit 124 accesses the data cache tag array 206 and the data cache data array 208 with the physical address 224 in order to get the status 226 and cache line data 228, and the mux 214 selects the load data 232 specified by the load instruction. Flow proceeds to blocks 414 and 416.

At block 414, the load unit 124 outputs the fetched load data 232 onto its result bus. Flow proceeds to block 418.

At block 416, the reservation station 112 issues the alu microinstruction to an execution unit 122, such as an integer execution unit, since the load data 232 is now available as a source operand. Flow proceeds to block 418.

At block 418, the integer unit 122 receives the load data 232 from the load unit 124 result bus as a source operand. Flow proceeds to block 422.

At block 422, the integer unit 122 performs the ALU operation specified by the alu microinstruction on the load data 232 received from the load unit 124 to generate an alu result. Flow proceeds to block 424.

At block 424, the integer unit 122 outputs the alu result on its result bus 152. Flow proceeds to block 426.

At block 426, the ROB 114 receives the alu result from the integer unit 122 result bus 152 and stores it. Flow proceeds to block 428.

At block 428, the ROB 114 retires the alu result stored therein to the destination GPR 112. Flow ends at block 428.

Figure 5:
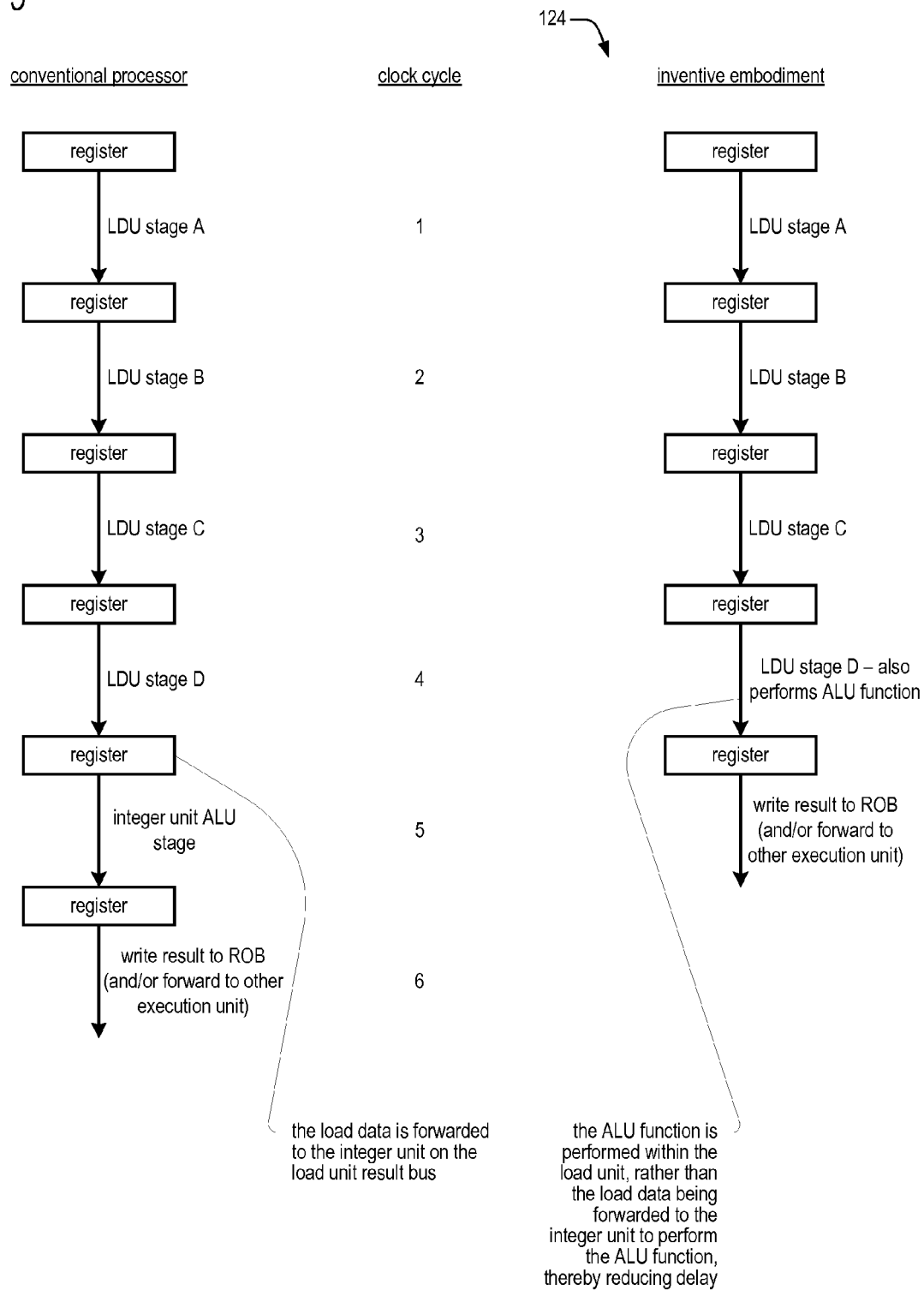
FIG. 5 is a timing diagram illustrating a benefit of embodiments of the present invention.

As may be seen by comparing FIGS. 3 and 4, the fact that the instruction translator 104 generates a single ldalu microinstruction and the load unit 124 includes a ALU 142 to perform the ALU operation specified by the ldalu microinstruction advantageously avoids the forwarding operation incurred by the conventional microprocessor, as shown in FIG. 5.

Referring now to FIG. 5, a timing diagram illustrating a benefit of embodiments of the present invention is shown. Six clock cycles are shown in FIG. 5. On the left-hand side of FIG. 5, a pipeline of stages separated by registers as might be present in a conventional microprocessor is shown. On the right-hand side of FIG. 5, a pipeline of stages separated by registers according to one embodiment of the microprocessor 100 of the present invention is shown. In the example of FIG. 5, it is assumed that the load unit 124 comprises four pipeline stages, denoted A, B, C, and D. However, it should be noted that other embodiments are contemplated with different numbers of pipeline stages within the load unit 124. In the example of FIG. 5, it is assumed that the integer ALU unit of the conventional microprocessor comprises a single stage.

In the conventional microprocessor, a load instruction proceeds down the four pipeline stages A, B, C, and D of the load unit 124 during respective clock cycles 1, 2, 3, and 4. The load data is then forwarded to the integer unit which performs an ALU operation on the forwarded load data during clock cycle 5. Finally, during clock cycle 6, the alu result generated by the integer unit is written to the ROB 114 and forwarded to the other execution units 122.

In the microprocessor 100 of FIG. 1 of the present invention, a ldalu instruction proceeds down the four pipeline stages A, B, C, and D of the load unit 124 during respective clock cycles 1, 2, 3, and 4, similar to the operation of the conventional microprocessor. However, in contrast to the conventional microprocessor, during clock cycle 4 within the D stage of the load unit 124, the ALU 142 performs the ALU operation specified by the ldalu microinstruction on the load data 232 to generate the alu-result 154. During clock cycle 5, the alu-result 154 generated by the load unit 124 is written to the ROB 114 and forwarded to the other execution units 122. Thus, as may be observed, the microprocessor 100 of FIG. 1 advantageously generates the alu-result 154 and makes it available to other instructions at least one clock cycle earlier than the conventional microprocessor. If, as discussed above, the distance the signals must travel on the forwarding buses between the different execution units and the RC time constants associated with the signal traces are such that the forwarding delay is increased, then the time saved by the present invention increases.

Figure 7:
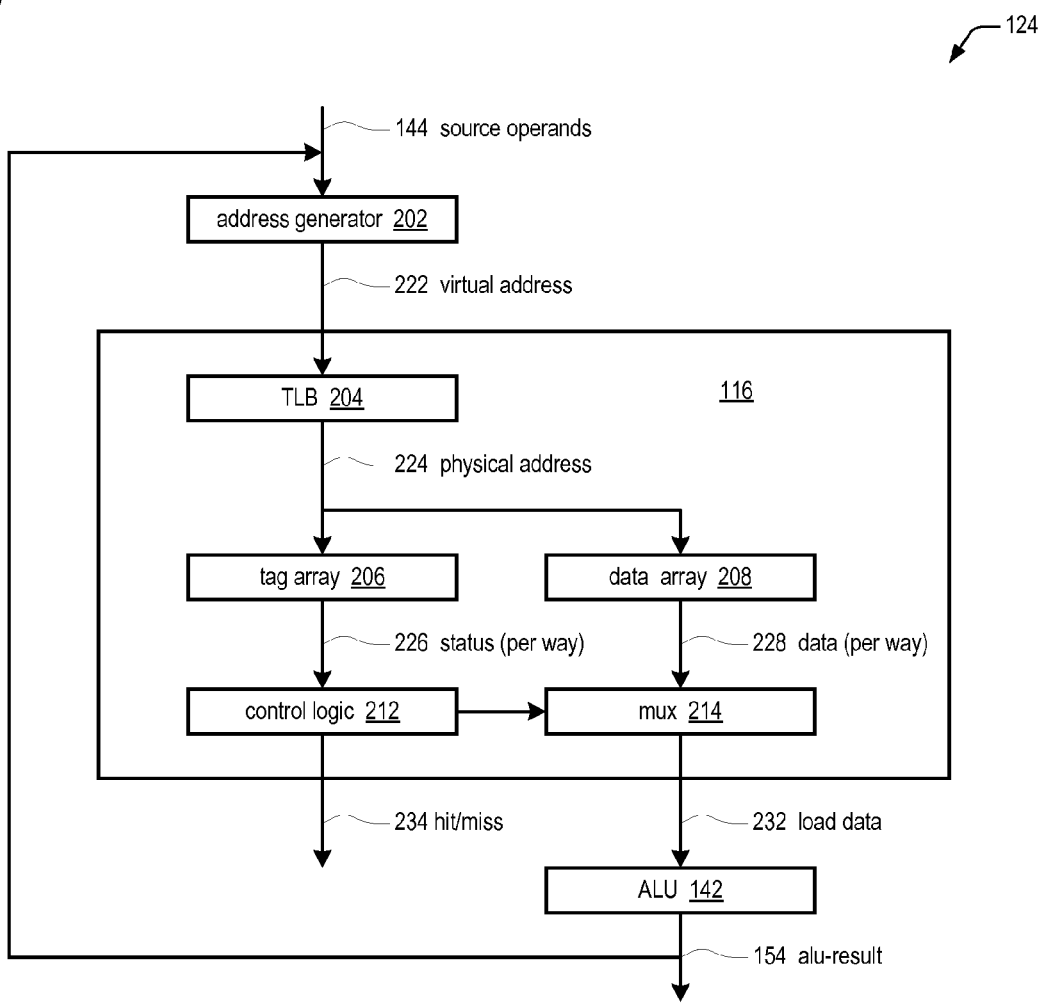
FIG. 7 is a block diagram of the load unit of FIG. 1 according to an alternate embodiment of the present invention.

Referring now to FIG. 7, a block diagram of the load unit 124 of FIG. 1 according to an alternate embodiment of the present invention is shown. The load unit 124 of FIG. 7 is similar to the load unit 124 of FIG. 1; however, the load unit 124 of FIG. 7 internally forwards the alu-result 154 back to itself as a source operand 144 for computing a load address 222 of a subsequent load instruction (or ldalu instruction). In some designs, the internal forwarding path may be shorter than the external forwarding path from the other execution unit in the conventional microprocessor that would perform the ALU operation and from which the result would be forwarded to the load unit 124 as a source operand 144. This advantage is illustrated in FIG. 8.

Figure 8:
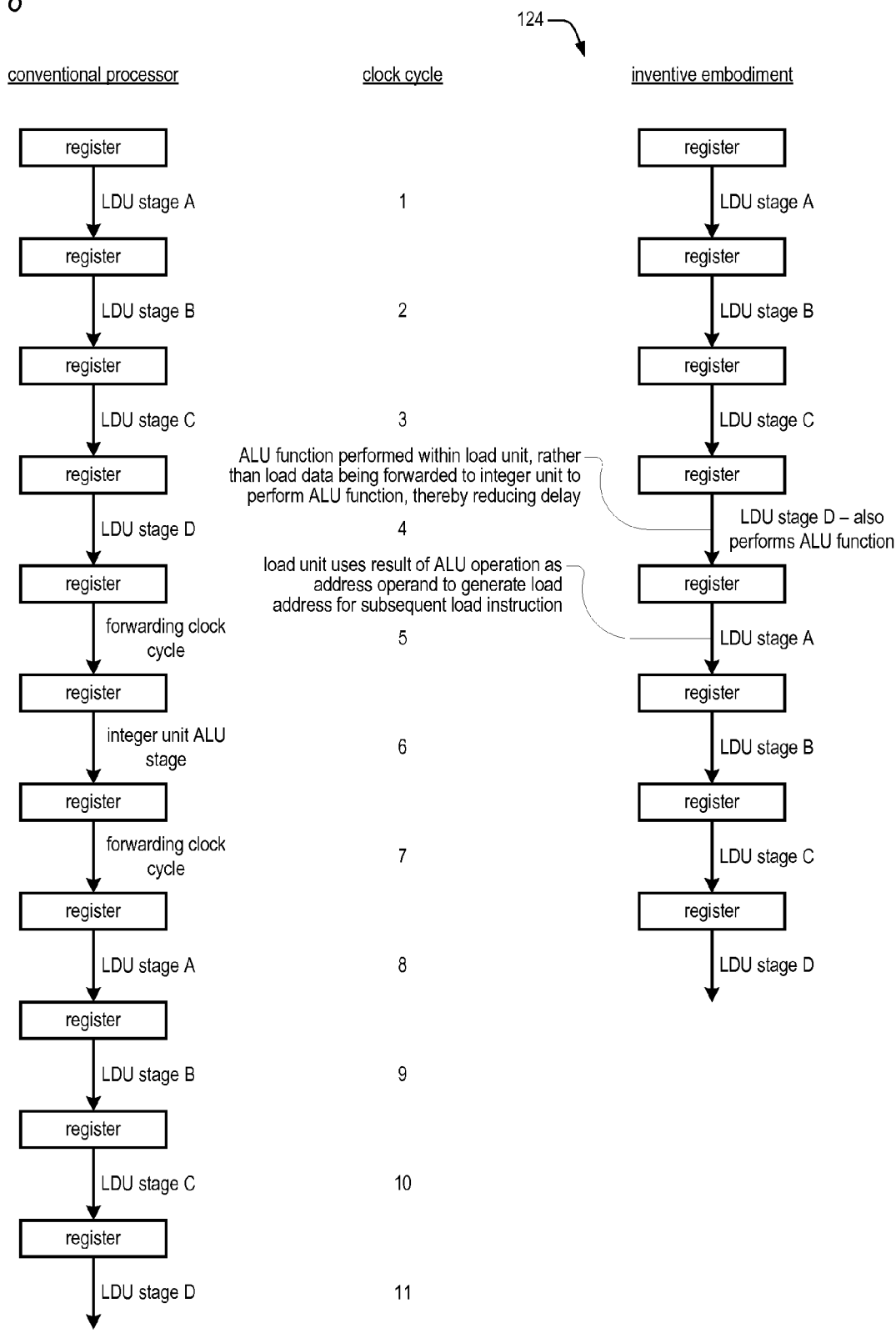
FIG. 8 is a timing diagram illustrating a benefit of the alternate embodiment of FIG. 7.

FIG. 8 is a timing diagram similar to the timing diagram of FIG. 5. However, the example of FIG. 8 assumes, in the case of the conventional microprocessor, that a load instruction follows the alu microinstruction and consumes the alu result of the alu microinstruction for use as a source operand to calculate the load address; similarly, FIG. 8 assumes, in the case of the microprocessor 100 of the present invention, that a load instruction follows the ldalu microinstruction and consumes the alu-result 154 of the ldalu microinstruction for use as a source operand to calculate the load address. Furthermore, the example of FIG. 8 assumes that the conventional microprocessor (and the microprocessor 100) requires an extra clock cycle to forward a result from the load unit 124 to the integer unit 122, and requires an extra clock cycle to forward a result from the integer unit 122 to the load unit 124, as shown in the conventional microprocessor pipeline in clock cycles 5 and 7, respectively. As shown in FIG. 8, the load unit 124 of the present invention performs the ALU operation specified by the ldalu microinstruction in the D stage during clock cycle 4 and internally forwards the alu-result 154 to itself such that the load unit 124 is able to use the alu-result 154 during clock cycle 5 to generate the load address 222, rather than having to have an alu result forwarded to it from another execution unit 122. Thus, in the example, the microprocessor 100 having the load unit 124 of FIG. 7 is advantageously able to process the ldalu/load microinstruction sequence in three less clock cycles than the conventional microprocessor is able to process the equivalent load/alu/load microinstruction sequence.

ALU Function Integrated into Stores

Figure 9:
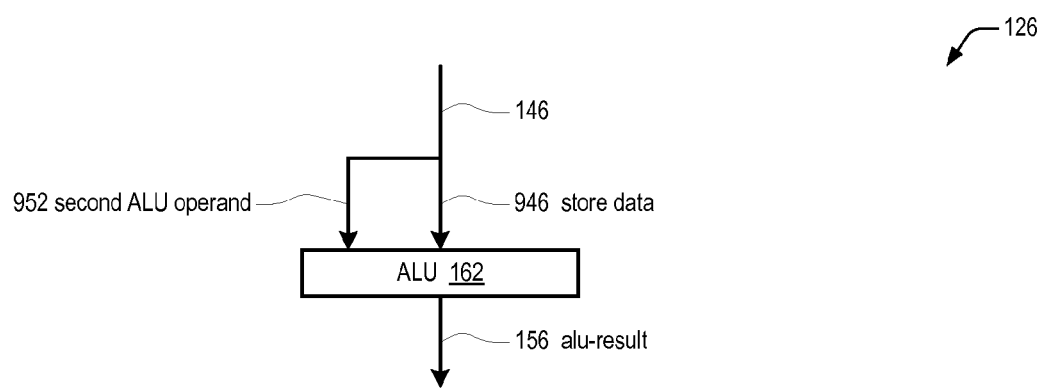
FIG. 9 is a block diagram of the store unit of FIG. 1 according to the present invention.

Referring now to FIG. 9, a block diagram of the store unit 126 of FIG. 1 according to the present invention is shown. The store unit 126 includes the ALU 162 of FIG. 1. The ALU 162 receives store data 946 on bus 146 from either the GPR set 112 or on forwarding buses 148 from the execution units 122/124/126. The ALU 162 performs an ALU operation on the store data 946 to generate an alu-result 156. The alu-result 156 is provided to a store buffer in the memory subsystem 116, to the ROB 114, and on a forwarding bus 148 to the execution units 122/124/126. The store buffer eventually writes the alu-result 156 to memory. The ALU operation may be any of the single source operand ALU operations performed by the load unit 124 as described above with respect to FIG. 2. Additionally, according to one embodiment, the ALU 162 may receive a second source operand 952 such that the ALU operation may be any of the double source operand ALU operations performed by the load unit 124 as described above with respect to FIG. 6.

As discussed in more detail below with respect to FIGS. 10 through 12, by integrating the ALU 162 within the store unit 126 to perform ALU operations on the store data 946 before writing it to memory, advantageously the result forwarding delay that would be required in a conventional microprocessor is avoided.

In one embodiment, the microprocessor 100 breaks store operations into two distinct microinstructions: a store address microinstruction and a store data microinstruction; and, the microprocessor 100 includes two separate units for performing the store address and store data microinstructions: a store address unit and a store data unit. The store address unit includes an address generator (similar to the address generator 202 of the load unit 124) that generates a virtual store address from the source operands specified by store address microinstruction. The store address unit looks up the virtual store address in the TLB 204 to obtain a translated physical store address, which the store address unit writes to a store buffer in the memory subsystem 116 that was allocated for the store operation. The physical store address in the store buffer is eventually used to write to the cache tag array 206 and data array 208 or system memory. In a conventional microprocessor, the store data unit simply receives the store data (which would have had an ALU operation performed on it by an execution unit other than the store data unit) and writes the store data to the store buffer. The store buffer eventually writes the store data from the store data unit to memory at the address generated by the store address unit. According to one embodiment, the store address unit is not shown, and the store data unit is the store unit 126 of FIG. 9.

Figure 10:
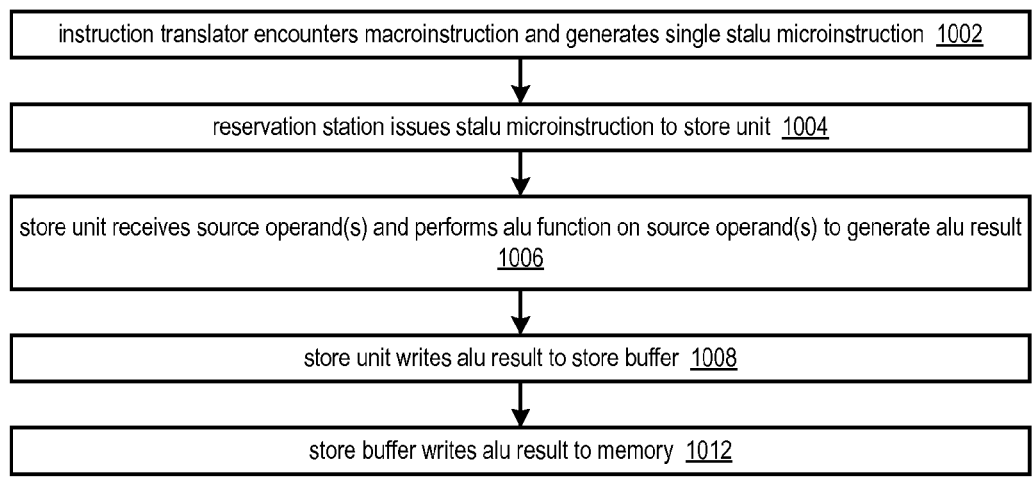
FIG. 10 is a flowchart illustrating operation of the microprocessor of FIG. 1 according to the present invention.

Referring now to FIG. 10, a flowchart illustrating operation of the microprocessor 100 of FIG. 1 according to the present invention is shown. Flow begins at block 1002.

At block 1002, the instruction translator 104 decodes a macroinstruction 132 and translates it into a single stalu microinstruction 134. The macroinstruction 132 specifies a GPR 112 that holds an operand upon which an ALU operation is to be performed to generate a result and the result is to be written to memory. The stalu instruction specifies the same GPR 112 for its source operand as the macroinstruction 132. Furthermore, the stalu instruction specifies the same ALU operation specified by the macroinstruction 132. Flow proceeds to block 1004.

At block 1004, the reservation station 112 issues the stalu instruction to the store unit 126. Flow proceeds to block 1006.

At block 1006, the store unit 126 receives the store data 946 from the GPR 112 (or forwarding bus 148) specified by the stalu instruction. If the stalu instruction specifies a two-operand ALU operation, the store unit 126 additionally receives the second operand 952 from a second GPR 112 (or forwarding bus 148). The ALU 162 of the store unit 126 performs the ALU operation specified by the stalu instruction on the store data 946 (and second operand 952, if specified) to generate the alu-result 156. Flow proceeds to block 1008.

At block 1008, the store unit 126 writes the alu-result 156 to a store buffer in the memory subsystem 116. As discussed above, according to one embodiment, the physical memory address to which the alu-result 156 will be written is also written to the store buffer by a store address unit in response to a store address microinstruction. Flow proceeds to block 1012.

At block 1012, the store buffer writes the alu-result 156 to memory. Flow ends at block 1012.

Figure 11:
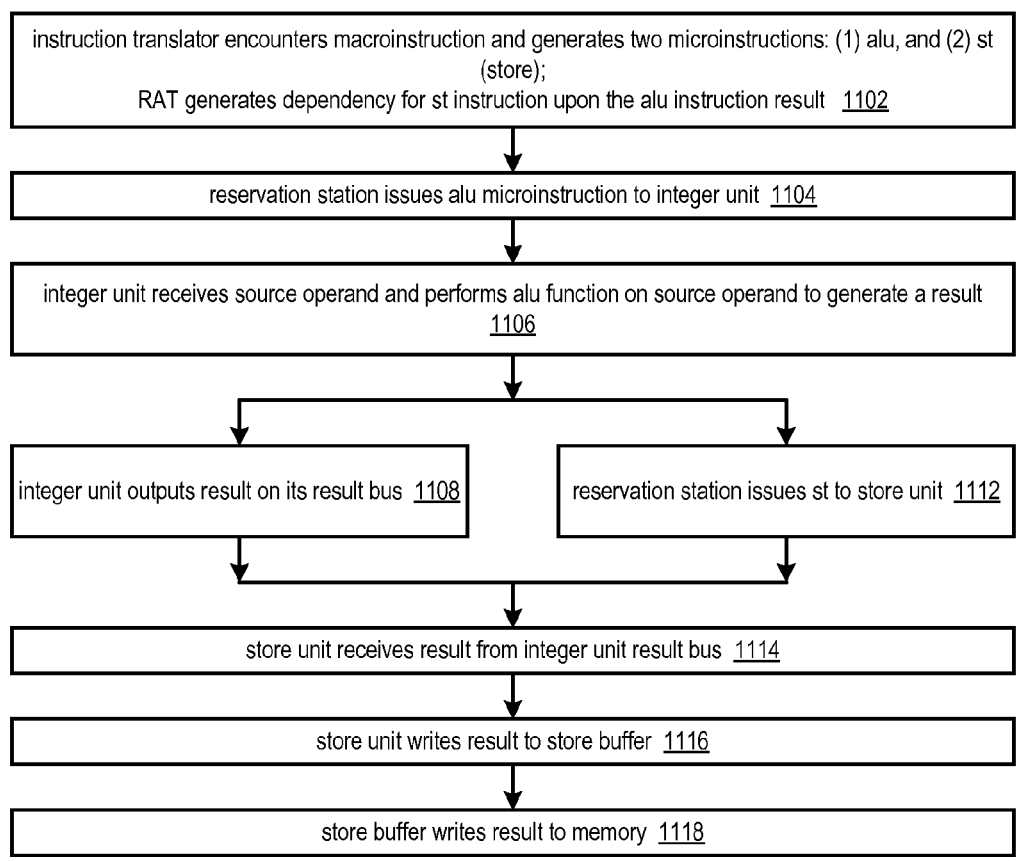
FIG. 11 is a flowchart illustrating operation of a conventional microprocessor.

Referring now to FIG. 11, a flowchart illustrating operation of a conventional microprocessor is shown in order to contrast the operation of the microprocessor 100 of the present invention. Although the elements of the microprocessor 100 of FIG. 1 are used in the description of FIG. 11, it should be understood that in the conventional microprocessor the store unit does not include an ALU for performing ALU operations on the store data and the instruction translator does not generate special stalu instructions for the store unit. Flow begins at block 1102.

At block 1102, the instruction translator 104 decodes a macroinstruction 132 and translates it into two microinstructions 134. The macroinstruction 132 specifies a GPR 112 that holds an operand upon which an ALU operation is to be performed to generate a result and the result is to be written to memory. The first translated microinstruction is an alu instruction that specifies the same GPR 112 for its source operand as the macroinstruction 132. Furthermore, the alu instruction specifies the same ALU operation specified by the macroinstruction 132. The alu instruction specifies a temporary register for its destination operand. The second translated microinstruction is a store microinstruction. The store microinstruction specifies the temporary register for its source operand, i.e. for its store data. Flow proceeds to block 1104.

At block 1104, the reservation station 112 issues the alu instruction to the integer unit 122. Flow proceeds to block 1106.

At block 1106, the integer unit 122 receives the source operand from the GPR 112 (or forwarding bus 148) specified by the alu instruction and performs the ALU operation specified by the alu instruction on the source operand to generate a result. Flow proceeds to blocks 1108 and 1112.

At block 1108, the integer unit 122 outputs the result on its result bus 152. Flow proceeds to block 1114.

At block 1112, the reservation station 108 issues the store microinstruction to the store unit 126. Flow proceeds to block 1114.

At block 1114, the store unit 126 receives the result from the integer unit 122 result bus 152. Flow proceeds to block 1116.

At block 1116, the store unit 126 writes the result to the store buffer. Flow proceeds to block 1118.

At block 1118, the store buffer writes the result to memory. Flow ends at block 1118.

Figure 12:
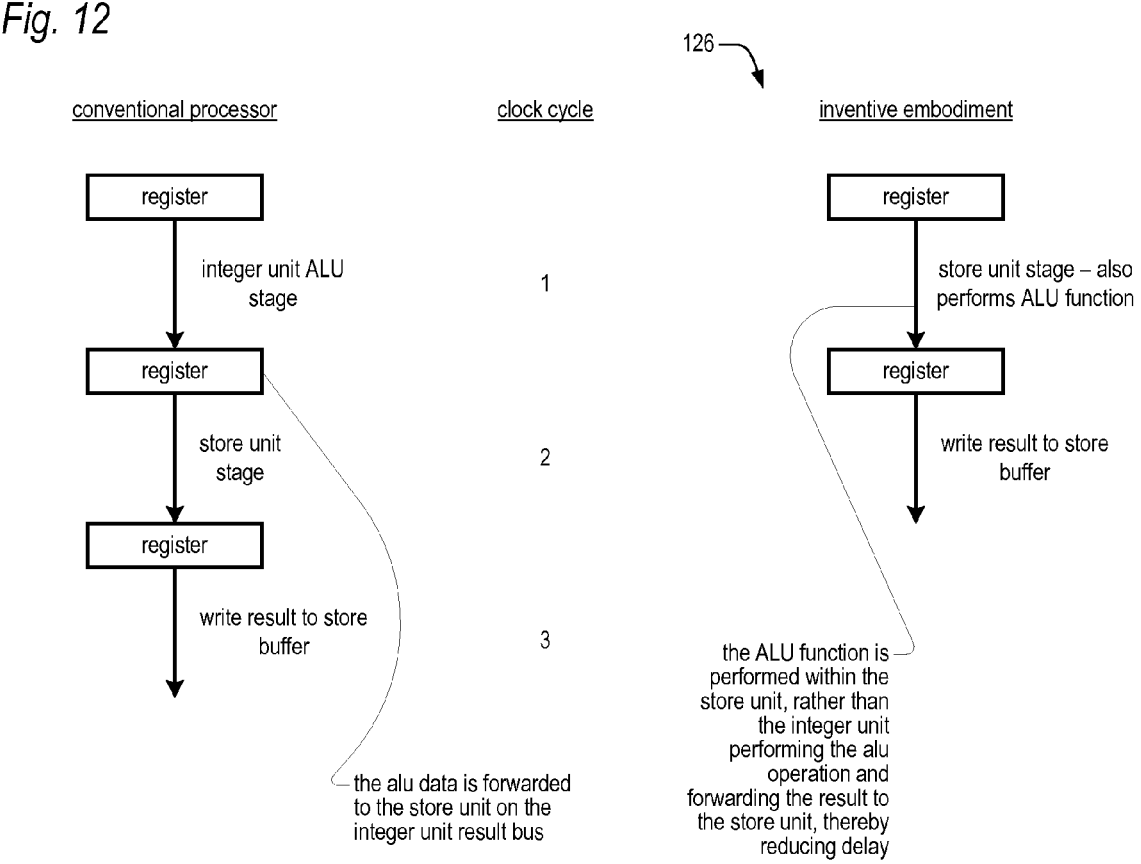
FIG. 12 is a timing diagram illustrating a benefit of embodiments of the present invention.

As may be seen by comparing FIGS. 10 and 11, the fact that the instruction translator 104 generates a single stalu microinstruction and the store unit 126 includes a ALU 162 to perform the ALU operation specified by the stalu microinstruction advantageously avoids the forwarding operation incurred by the conventional microprocessor, as shown in FIG. 12.

Referring now to FIG. 12, a timing diagram illustrating a benefit of embodiments of the present invention is shown. Three clock cycles are shown in FIG. 12. On the left-hand side of FIG. 12, a pipeline of stages separated by registers as might be present in a conventional microprocessor is shown. On the right-hand side of FIG. 12, a pipeline of stages separated by registers according to one embodiment of the microprocessor 100 of the present invention is shown. In the example of FIG. 12, it is assumed that the store unit 126 comprises a single pipeline stage. However, it should be noted that other embodiments are contemplated with different numbers of pipeline stages within the store unit 126. In the example of FIG. 12, it is assumed that the integer ALU unit of the conventional microprocessor comprises a single stage.

In the conventional microprocessor, an alu instruction proceeds down the pipeline stage of the integer unit 122 which performs the specified ALU operation to generate a result during clock cycle 1. The result is then forwarded from the integer unit on the forwarding bus 148 to the store unit which receives the result as store data during clock cycle 2. Finally, during clock cycle 3, the store data is written to the store buffer.

In the microprocessor 100 of FIG. 1 of the present invention, a stalu instruction proceeds down the pipeline stage of the store unit 126 during clock cycle 1. In contrast to the conventional microprocessor, during clock cycle 1, the store unit 126 ALU 162 performs the ALU operation specified by the stalu microinstruction on the store data 946 (and second operand 952, if specified) to generate the alu-result 156. During clock cycle 2, the alu-result 156 generated by the store unit 126 is written to the store buffer. Thus, as may be observed, the microprocessor 100 of FIG. 1 advantageously generates the alu-result 156 and makes it available to the store buffer and to other instructions at least one clock cycle earlier than the conventional microprocessor. If, as discussed above, the distance the signals must travel on the forwarding buses between the different execution units and the RC time constants associated with the signal traces are such that the forwarding delay is increased, then the time saved by the present invention increases.

It is noted that although an embodiment has been described with respect to FIG. 10 in which the macroinstruction 132 specifies a GPR 112 that holds an operand upon which an ALU operation is to be performed to generate a result and the result is to be written to memory, the instruction translator 104 may generate a stalu instruction in combination with other microinstructions, including the ldalu microinstruction, to implement other macroinstructions. For example, some macroinstructions 132 specify read/modify/write-type operations on a memory operand. That is, the macroinstruction specifies an ALU operation and a memory address that is the location of an operand upon which the ALU operation is to be performed and the result is to be written back to the memory location. For such macroinstructions, the instruction translator 104 may generate a conventional load microinstruction followed by a stalu microinstruction, or a ldalu microinstruction followed by a conventional store microinstruction, according to the present invention.

Another advantage of the embodiments of the present invention is that by merging into the single ldalu (stalu) microinstruction the individual load and alu (alu and store) microinstructions, only one instruction slot in the microprocessor 100 is consumed rather than two. For example, the ldalu (stalu) microinstruction occupies only a single entry in each of the RAT 116, reservation stations 108, and ROB 114 rather than the two entries that would be consumed by distinct load and alu (alu and store) microinstructions. Specifically, by making more room in the ROB 114 for more microinstructions, the ldalu microinstruction potentially creates a larger pool, or window, of microinstructions from which to issue to the execution units 122/124/126, thereby potentially increasing the lookahead capability of the microprocessor 100, which exploits more fully the instruction level parallelism of the program being executed, which may increase the utilization of the execution units 122/124/126. Furthermore, the single ldalu microinstruction produces only two accesses to the GPRs 112 (read of the source operands and write of the result), whereas the load and alu microinstruction sequence produces four accesses; thus, the present invention may reduce congestion at the GPRs 112, and may enable the microprocessor 100 design to include smaller, faster, lower power, and less complex GPRs 112. Finally, the number of microinstructions which the instruction translator 104 can generate per clock cycle is finite (in one embodiment the number is three and in another embodiment the number is four). And, according to one embodiment in order to reduce the complexity of the instruction translator 104, the instruction translator 104 must generate in the same clock cycle all the microinstructions required to implement a given macroinstruction, which causes some of the finite number of instruction slots to be empty in some clock cycles. For these reasons, enabling the instruction translator 104 to generate one less microinstruction to implement some macroinstructions (i.e., ldalu rather than load and alu, or stalu rather than alu and store) may enable the instruction translator 104 to more fully utilize its finite number of microinstruction slots and thereby translate macroinstructions at a faster rate.

Although embodiments have been described with respect to an x86 architecture microprocessor, the invention is not limited to x86 architecture microprocessors. Rather, the notion of incorporating one or more ALUs into a pipelined load and/or store unit of a superscalar pipelined microprocessor may be utilized within microprocessors having other architectures.

Furthermore, although embodiments have been described in which the instruction translator generates the ldalu microinstruction, e.g., block 302 of FIG. 3 (or stalu microinstruction, e.g., block 1002 of FIG. 10), in response to a complex macroinstruction that requires both a read from memory and an ALU operation (or both an ALU operation and a write to memory), embodiments are contemplated in which the instruction translator recognizes a sequence of macroinstructions that involves a first macroinstruction that moves an operand from memory into a register followed by a second macroinstruction that performs an ALU operation on the operand in the register and writes it to a destination register (or a first macroinstruction that performs an ALU operation on an operand in a register and writes it to a destination register followed by a second macroinstruction that moves the operand to memory from the destination register). The translator merges these two macroinstructions into a single ldalu microinstruction that instructs the load unit to perform the ALU operation on the load data before writing it to the destination register (or into a single stalu microinstruction that instructs the store unit to perform the ALU operation on the store data before writing it to the memory), thereby avoiding the result forwarding delay. In other words, the ldalu and stalu microinstructions may be employed to advantage in various situations, not just in response to translating a single macroinstruction. For another example, in one embodiment, the microprocessor 100 includes a microcode unit that includes microcode instructions of microcode routines stored in a microcode memory and a microsequencer that sequences the microinstructions down the pipeline of the microprocessor 100. The microcode may be invoked by the instruction translator 104 to implement complex macroinstructions or to perform other functions such as built-in-self-test (BIST) or other initialization functions of the microprocessor 100. Advantageously, the microcode may employ the ldalu and stalu microinstructions as needed to reduce the execution time and/or code size of programs executing on the microprocessor 100.

Still further, although embodiments have been described in which the ALU in the load unit/store unit requires less than a clock cycle to perform its ALU function (i.e., performs its ALU function in a portion of the clock cycle associated with the last stage of the load/store unit) such that the number of clock cycles to perform all load/store instructions is the same regardless of whether the load/store is a normal load/store or an ALU-integrated load/store, other embodiments are contemplated in which the ALU operation takes more than the available time in the last stage of the load/store unit, thus causing ALU-integrated load/stores to take more clock cycles than normal load/stores and/or some ALU-integrated load/stores to take more clock cycles than other ALU-integrated load/stores, depending upon the complexity of the ALU operation. In such an embodiment, the instruction scheduler in the reservation stations must take into account the variable number of clock cycles required to perform a load/store instruction.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   a register set, defined by an instruction set architecture of the microprocessor;
   a cache memory;
   a superscalar pipelined architecture including a plurality of execution units; and
   a load unit, coupled to the cache memory, wherein the load unit is distinct from the other execution units of the microprocessor and includes an arithmetic/logic unit (ALU) in which the load unit and the ALU are not separated by a register;
      wherein the load unit is configured to receive an instruction that specifies a memory address of a source operand, an operation to be performed on the source operand to generate a result, and a destination register of the register set to which the result is to be stored;
      wherein the load unit is configured to read the source operand from the cache memory and to provide the source operand only to the ALU without registering the source operand before being provided to the ALU;
      wherein the ALU is configured to perform the operation on the source operand to generate the result; and
      wherein the load unit is further configured to output the result for subsequent retirement to the destination register.

2. The microprocessor of claim 1, wherein the load unit is further configured to receive a second instruction that specifies a second memory address of a second source operand and a second destination register of the register set to which the second source operand is to be stored without performing an operation on the second source operand, wherein the load unit is configured to execute the first and second instructions in the same number of clock cycles.

3. The microprocessor of claim 1, wherein the load unit further comprises:
   an address generator; and
   a bus, coupled to the address generator, the bus configured to forward the result of the instruction to an input of the address generator, wherein the address generator is configured to use the forwarded result to generate a memory address to enable the load unit to access the cache memory for a subsequent load instruction.

4. The microprocessor of claim 1, wherein none of the other execution units are configured to read the cache memory.

5. The microprocessor of claim 1, wherein at least one of the other execution units has an ALU configured to perform the operation specified by the instruction; however, the load unit does not forward the source operand to any of the at least one of the other execution units to perform the operation on the source operand to generate the result.

6. The microprocessor of claim 1, wherein the load unit is configured to execute all instructions that read from the cache memory and the other execution units are configured to execute none of the instructions that read from the cache memory.

7. The microprocessor of claim 1, wherein the instruction further specifies a second source operand, wherein the operation is to be performed on the first source operand and the second source operand to generate the result.

8. The microprocessor of claim 7, wherein the second source operand is provided to the load unit by a register of the register set.

9. The microprocessor of claim 7, further comprising:
a storage element, configured to temporarily store the second source operand in response to the memory address of the first operand missing in the cache memory.

10. The microprocessor of claim 1, wherein the load unit requires only two accesses to the register set to execute the instruction.

11. The microprocessor of claim 1, further comprising:
an instruction translator, configured to translate a macroinstruction into the instruction executed by the load unit, wherein the macroinstruction is defined by the instruction set architecture.

12. The microprocessor of claim 11, wherein the instruction translator is further configured to translate a second macroinstruction defined by the instruction set architecture into a pair of instructions comprising the instruction as a first instruction and a second instruction, wherein the second instruction is executed by one of the other execution units that receives the result of the first instruction from the load unit and writes the result to the cache memory.

13. The microprocessor of claim 11, wherein the instruction translator is configured to translate first and second macroinstructions defined by the instruction set architecture into the instruction.

14. The microprocessor of claim 11, wherein the instruction set architecture of the microprocessor is an x86 architecture.

15. The microprocessor of claim 1, wherein the operation comprises a zero-extend operation that zero-extends the source operand to a size of the destination register.

16. The microprocessor of claim 1, wherein the operation comprises a Boolean NOT operation that inverts each bit of the source operand.

17. The microprocessor of claim 1, wherein the operation comprises a NEGATE operation that generates a two's complement negation of the source operand.

18. The microprocessor of claim 1, wherein the operation comprises an increment operation that increments the source operand.

19. The microprocessor of claim 1, wherein the operation comprises a decrement operation that decrements the source operand.

20. The microprocessor of claim 1, wherein the operation comprises a sign-extend operation that sign-extends the source operand.

21. The microprocessor of claim 1, wherein the operation comprises a zero detect operation that generates the result as a true value if the source operand is zero and generates the result as a false value if the source operand is non-zero.

22. The microprocessor of claim 1, wherein the operation comprises a ones detect operation that generates the result as a true value if all bits of the source operand are binary '1' and generates the result as a false value otherwise.

23. The microprocessor of claim 1, wherein the operation comprises a data format conversion operation that formats the source operand to a data format that is different from the data format in which the source operand was read from the data cache.

24. The microprocessor of claim 23, wherein the instruction specifies the data format.

25. The microprocessor of claim 1, wherein the operation comprises a Boolean logic operation, wherein the ALU performs the specified Boolean logic operation on the source operand and a second source operand to generate the result.

26. The microprocessor of claim 25, wherein the Boolean logic operation comprises one of the following: AND, OR, XOR, NOR.

27. The microprocessor of claim 1, wherein the operation comprises an arithmetic operation, wherein the ALU performs the specified arithmetic operation on the source operand and a second source operand to generate the result.

28. The microprocessor of claim 27, wherein the arithmetic operation comprises one of the following: ADD, SUBTRACT, MULTIPLY.

29. A method for a microprocessor to process an instruction, comprising:
providing the microprocessor with a superscalar pipelined architecture having a register set defined by an instruction set architecture of the microprocessor, a cache memory, execution units, and a load unit including an arithmetic/logic unit (ALU) which together are distinct from the other execution units of the microprocessor and wherein the load unit and the ALU are not separated by a register;
receiving an instruction that specifies a memory address of a source operand, an operation to be performed on the source operand to generate a result, and a destination register of the register set to which the result is to be stored wherein said receiving the instruction is performed by the load unit;
reading the source operand from the cache memory and providing the source operand only to the ALU without registering the source operand before being provided to the ALU, wherein said reading and providing the source operand is performed by the load unit;
performing the operation by the ALU on the source operand to generate the result rather than forwarding the source operand to any of the other execution units of the microprocessor to perform the operation on the source operand to generate the result; and
outputting the result for subsequent retirement to the destination register, wherein said outputting the result is performed by the load unit.

30. The method of claim 29, further comprising:
receiving a second instruction that specifies a second memory address of a second source operand and a second destination register of the register set to which the second source operand is to be stored without performing an operation on the second source operand;
wherein the first and second instructions are executed by the load unit in the same number of clock cycles.

31. The method of claim 29, further comprising:
receiving a second instruction subsequent to the first instruction, wherein the second instruction specifies the destination register as a source register, wherein said receiving the second instruction is performed by the load unit;

forwarding the result of the first instruction to the load unit, wherein said forwarding the result is performed by the load unit;

generating a second memory address for the second instruction using the forwarded result, wherein said generating the second memory address is performed by the load unit;

reading the cache memory using the second memory address, wherein said reading the cache memory is performed by the load unit.

32. The method of claim 29, further comprising:
translating a macroinstruction into the instruction executed by the load unit, wherein the macroinstruction is defined by the instruction set architecture.

33. The method of claim 32, further comprising:
translating a second macroinstruction defined by the instruction set architecture into a pair of instructions comprising the instruction as a first instruction and a second instruction, wherein the second instruction is executed by one of the other execution units that receives the result of the first instruction from the load unit and writes the result to the cache memory.

34. The method of claim 32, further comprising:
translating first and second macroinstructions defined by the instruction set architecture into the instruction.

35. The method of claim 29, wherein the operation comprises at least one of the following operations: a zero-extend operation, a Boolean NOT operation, a NEGATE operation, an increment operation, a decrement operation, a sign-extend operation, a zero detect operation, a ones detect operation, a data format conversion operation.

36. The method of claim 29, wherein the operation comprises a Boolean logic operation, wherein the load unit ALU performs the specified Boolean logic operation on the source operand and a second source operand to generate the result.

37. The method of claim 29, wherein the operation comprises an arithmetic operation, wherein the load unit ALU performs the specified arithmetic operation on the source operand and a second source operand to generate the result.

38. A computer program product for use with a computing device, the computer program product comprising:
a non-transitory machine-readable storage medium, having computer readable program code embodied in said medium, for specifying a superscalar pipelined microprocessor, the computer readable program code comprising:
first program code for specifying a register set, defined by an instruction set architecture of the microprocessor;
second program code for specifying a cache memory;
third program code for specifying execution units; and
fourth program code for specifying a load unit, coupled to the cache memory, wherein the load unit is distinct from the other execution units of the microprocessor, the load unit including an arithmetic/logic unit (ALU) such that the load unit and the ALU are not separated by a register;
wherein the load unit is configured to receive an instruction that specifies a memory address of a source operand, an operation to be performed on the source operand to generate a result, and a destination register of the register set to which the result is to be stored;
wherein the load unit is configured to read the source operand from the cache memory and to provide the source operand only to the ALU without registering the source operand before being provided to the ALU;
wherein the ALU is configured to perform the operation on the source operand to generate the result; and
wherein the load unit is further configured to output the result for subsequent retirement to the destination register.

\* \* \* \* \*